(12) United States Patent
Waher

(10) Patent No.: US 8,832,572 B2
(45) Date of Patent: Sep. 9, 2014

(54) DEVICE INDEPENDENT METHOD FOR DEFINING A GRAPHICAL USER INTERFACE

(75) Inventor: Peter Waher, Solna (SE)

(73) Assignee: Clayster Asia Ltd., Hong Kong (CN)

( * ) Notice: Subject to any disclaimer, the term of this patent is extended or adjusted under 35 U.S.C. 154(b) by 204 days.

(21) Appl. No.: 13/330,818

(22) Filed: Dec. 20, 2011

(65) Prior Publication Data

US 2012/0159358 A1   Jun. 21, 2012

(30) Foreign Application Priority Data

Dec. 20, 2010   (EP) ...................................... 10195911

(51) Int. Cl.
*G06F 9/44* (2006.01)
(52) U.S. Cl.
CPC .................................. *G06F 9/4443* (2013.01)
USPC ............ 715/762; 715/744; 717/100; 717/105
(58) Field of Classification Search
USPC .......................................... 715/762; 717/100
See application file for complete search history.

(56) References Cited

U.S. PATENT DOCUMENTS

| 5,060,170 | A  | * | 10/1991 | Bourgeois et al. | ............ 715/788 |
| 6,496,203 | B1 |   | 12/2002 | Beaumont et al. | |
| 6,732,181 | B2 | * | 5/2004  | Lim et al. | ....................... 709/229 |
| 8,005,316 | B1 | * | 8/2011  | Linburn et al. | ................ 382/283 |
| 2006/0272028 | A1 | * | 11/2006 | Maes | ............................... 726/27 |
| 2009/0031247 | A1 |   | 1/2009  | Walter et al. | |
| 2009/0172726 | A1 | * | 7/2009  | Vantalon et al. | ................ 725/32 |
| 2011/0289419 | A1 | * | 11/2011 | Yu et al. | ........................ 715/738 |

FOREIGN PATENT DOCUMENTS

EP   0822484   2/1998

OTHER PUBLICATIONS

Lo Turco, Salvatore: European Search Report, parent application EP10195911, issued Jul. 1, 2011, European Patent Office, Munich, DE.

* cited by examiner

*Primary Examiner* — Omar Abdul-Ali
*Assistant Examiner* — Sherrod Keaton
(74) *Attorney, Agent, or Firm* — Babcock IP, PLLC

(57) ABSTRACT

The invention relates to a client independent method for defining a graphical user interface (GUI) for a client device, the method comprising the steps of determining a dedicated display area of a display screen of the client device where the GUI is to be provided, defining a plurality of sub-regions of the display area, the size and location of each sub-region being allocated according to a predetermined pattern, assigning an application service for each of the sub-regions, providing each of the application services to its respective sub-region; and rendering the GUI within the dedicated display area of the display screen, thereby allowing a user of the client device to interact with the application services. The invention also relates to a client device adapted provide an interactive GUI to a user of the client device.

9 Claims, 2 Drawing Sheets

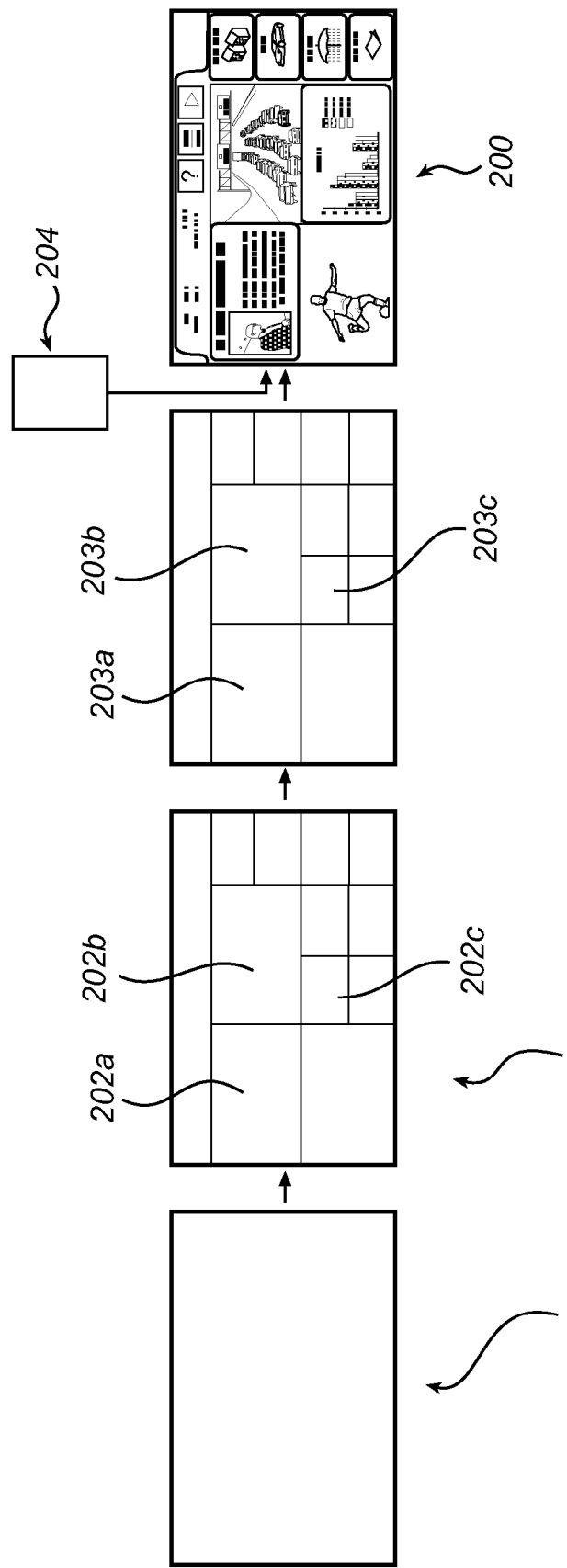

DEVICE INDEPENDENT METHOD FOR DEFINING A GRAPHICAL USER INTERFACE

TECHNICAL FIELD

The present invention relates to a device independent method for defining a graphical user interface (GUI) for a client device. The invention also relates to a client device being adapted to provide a GUI in which a plurality of application services may be interacted with by a user of the client device.

BACKGROUND OF THE INVENTION

Recently there has been a large increase in the number of electronic devices with advanced graphical interfaces (GUIs) used in the personal space, including for example mobile devices such as mobile phones, computer tablets, etc. Further to this and in a desire to automate the home, different types of controllers such as home and building automation devices have been provided.

Additionally, the lifetime and generation shift of the different electronic devices decrease thereby putting a high pressure on developers to speed up the process of developing new graphical user interfaces as well as software application for the new and/or updated electronic devices. Accordingly, there is a desire to define a new type of GUI for electronic devices, providing a simplification in regards to development of new software application and GUIs, as well as in regards to allowing for a user of the GUIs to be provided with a homogeneous and familiar GUI when moving between different electronic devices and between different generations of a specific electronic device.

For example US 2003/0063120 try to at least partly solve this problem by providing a scalable GUI (SGUI) architecture provided to adapt applications to the user interface for different heterogeneous device platforms. Even though US 2003/0063120 in its implementation of the SGUI architecture may provide for maximizing the fill of the display screen of the heterogeneous devices by means of using an intermediate representation of the user interface. However, there is still a desire to even further simplify the process of new and even more advanced GUIs and software applications for electronic devices having an even more attractive interface implemented in an even more flexible manner.

SUMMARY OF THE INVENTION

In view of the above, an object of the invention is to at least alleviate the problems discussed above. In particular, an object is to provide a more flexible solution for defining a graphical user interface (GUI) for a client device.

According to an aspect of the invention, there is provided a device independent method for defining a graphical user interface (GUI) for a client device, the method comprising the steps of determining a dedicated display area of a display screen of the client device where the GUI is to be provided, defining a plurality of sub-regions of the display area, the size and location of each sub-region being allocated according to a predetermined pattern, assigning an application service for each of the sub-regions, providing each of the application services to its respective sub-region; and rendering the GUI within the dedicated display area of the display screen, thereby allowing a user of the client device to interact with the application services.

The present invention provides means for defining a GUI that differs from the "normal" Windows form layout in the sense that the developer does not start with the details (i.e. putting controls on a form) but with the great scheme of things—the layout itself—i.e. divisions and subdivisions of space. Application services, for example in the form of controls, are then added as the last step in the design process. As a result of this process, no coordinates or sizes of controls are ever explicitly given. This inventive method has some advantages over prior art, including for example that it is always resolution independent, there is no need to worry about the details of the layout, since they are calculated automatically by a renderer of the client device (widths, heights, positions, etc.). Furthermore, each application service in each of the sub-regions may use the whole space available according to the subdivision made by its parents, i.e. the display area. Additionally, its easier to create a uniform design as well as making it quicker and/or easier to create a complex form.

The possibility to in a more quick and/or easy way create a complex GUI and service is further based on the fact that all client specific features may be disregarded as they are handled by the renderer of the client device. That include for example the interconnection with hardware based input devices such as a mouse, keyboard, touch screen, remote control etc. Additionally, connections to for example media players for recording and/or playing video and sound are also handled by the renderer of the client device. This essentially scales down the effort for creating a GUI and services as only the actual features of the GUI and services needs to be described. The renderer of the client device will then handle the connection with client specific components of the client device. In essence, this makes the GUI device independent as no information relating to the client device is comprised when providing the GUI, rather, this is handled by the client specific renderer.

In a preferred embodiment of the invention the step of rendering the GUI comprises the step of applying design guidelines to the application services. Accordingly, it is possible to extract common design guidelines and put them somewhere else (i.e. in Themes, etc., further reducing the complexity of GUI design, since adherence to design guidelines is now automatic, and doesn't have to be explicitly tested for each GUI.)

Furthermore, the method may also comprise the step of determining an area resolution of the dedicated display area, where for example the dedicated display area is defined as the total area of the display screen, e.g. of a screen of the client device. However, the dedicated display screen may also be defined as an area within a window of an application program, i.e. making the method useful also for designing stand alone software GUIs, or for designing a web page layout.

As the method provides the possibility to be used for different hardware platforms (e.g. client devices) it may be desirable that the step of rendering the GUI is provided using a rendering plug-in specific for the client device. The rendering plug-in is a computer program that is configured to create a client specific application by transforming the divisions into the sub-regions (sometimes denoted as Macro-layout) and the application services (sometimes referred to as Micro-layouts) into a client specific application applying an appropriate theme. The resulting client specific application can then be executed by a specific client device to render the GUI. It can be noted that the rendering plug-ins generally only handles the hardware resources and capabilities of the client device, and thus require no knowledge about the functionality of the services. This makes it easy to develop service applications for a variety of clients of different types, and virtually eliminates the need to modify the service applications when new types of clients are introduced.

According to another aspect of the invention, there is provided a client device comprising a display screen for allowing a user of the client device to interact with a graphical user interface (GUI) having application services, the client device being adapted to determining a dedicated display area of the display screen where the GUI is provided, defining a plurality of sub-regions of the display area, the size and location of each sub-region being allocated according to a predetermined pattern, assigning application services for each of the sub-regions, providing each of the application services to its respective sub-region, and rendering the GUI within the dedicated display area of the display screen, thereby allowing the user of the client device to interact with the application services. This aspect of the invention provides similar advantages as discussed above in relation to the previous aspect of the invention.

It should be noted that the client device may be at least one of a computer, a PDA, a controller device, a mobile phone, touch display, TV, etc. Furthermore, present and future electronic devices comprising a GUI may also be making use of the present invention.

Other objectives, features and advantages will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 2 schematically illustrates how a GUI is based on the client display resolution, a Macro-layout, a set of Micro-layouts, and a theme.

DETAILED DESCRIPTION OF PREFERRED EMBODIMENTS

Figure 1:
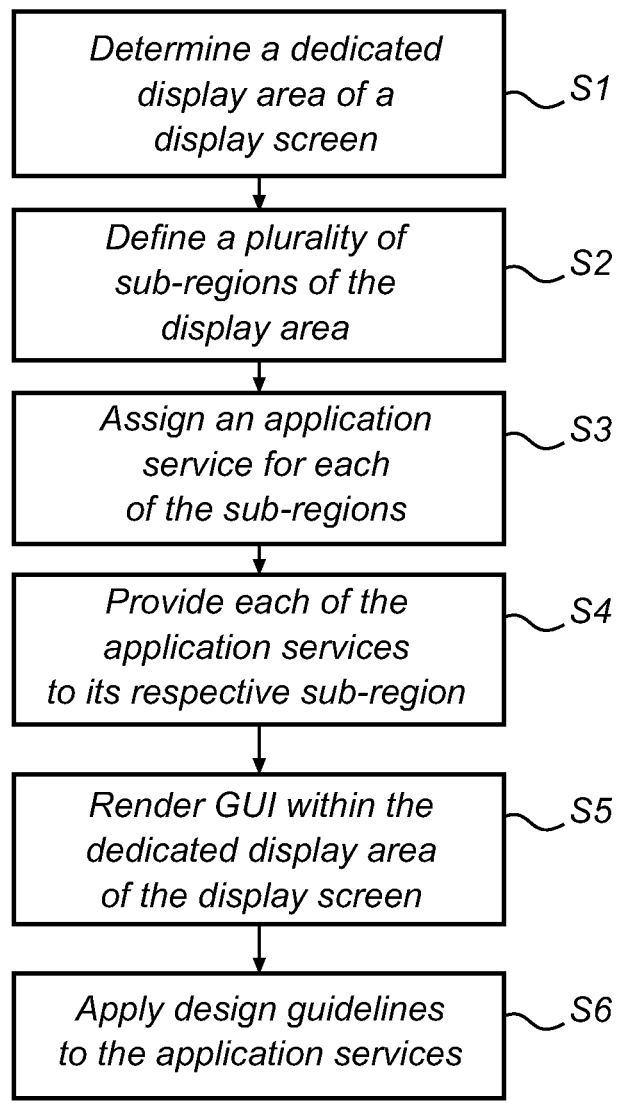
FIG. 1 is flow chart schematically illustrating the fundamental steps of a method according to an embodiment of the present invention for defining a graphical user interface (GUI) for an exemplary client device.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to those skilled in the art. Like reference characters refer to like elements throughout.

Referring now to the drawings and FIG. 1 in particular, there is depicted a flow chart schematically illustrating the fundamental steps of a method according to an embodiment of the present invention for defining a graphical user interface (GUI) for an exemplary client device. The exemplary client device may for example be a thin client device provided with a touch screen. However, other devices may also serve as a client device such as, for example, a digital TV, a computer screen or a mobile phone. Furthermore, other input means such as e.g. a keyboard, mouse, joystick, or a remote control may be utilized in addition to or instead of the touch screen.

For defining a GUI for a client device, there is determined (S1) a dedicated display area of a display screen of the client device where the GUI is to be provided. This dedicated area may for example be the complete display screen of the client device, but may also be a controllable section of a software application. Once the dedicated display area has been determined, a plurality of sub-regions of the display area are defined (S2), where the size and location of each sub-region being allocated according to a predetermined pattern. The predetermined pattern accordingly is the Macro-layout. Thereafter, each of sub-regions are assigned (S3) an application service. The application service, returns a Micro-layout, may for example be a functional feature, such as for example a collection of information relating to a specific subject, such as for example weather information, a consummation pattern, etc.

Following the assignment of the application service, each of the application services are provided (S4) to its respective sub-region and thereafter the GUI within the dedicated display area of the display screen are rendered using the renderer allocated to the client (S5).

Turning now to FIG. 2 which schematically illustrates how a GUI 200 can be generated on the client device from four types of input data using a renderer. The four types of input data are: a client display resolution 201; a Macro-layout 202; a set of Micro-layouts 203; and a theme 204.

The interface 200 is here a so-called "ten foot interface". The ten foot interface typically has a less detailed and less complex layout than a "two foot interface" used by a conventional computer monitor. Thus, the ten foot interface can preferably be used for screens having a lower resolution than a conventional computer monitor, such as e.g. a TV-screen or a user interface for a control system. Although the name suggests that the ten foot interface is designed and proportioned to be viewed at a distance of about ten feet, rather than a viewing distance of about two feet as is the case for a conventional computer monitor, the ten foot interface may be convenient also for shorter viewing distances. For example, a ten foot interface can preferably be used for a GUI displayed on a small screen, such as on a mobile phone, or on a touch screen.

The client display resolution 201 can be provided by an initialization function containing a script determined by the renderer that evaluates the available resolution of the display of the client device. As an alternative, the resolution 201 can be provided by an URL (Uniform Resource Locator), for example, when a HTTP based protocol is used.

The Macro-layout 202 is meta-information that determines the division of the available client display resolution into sub regions 202a-c. (To avoid cluttering the figure only three of the sub regions have been provided with a reference numeral.) The Macro-layout contains no absolute positions, thus making it scalable. Further, for each sub region, the Macro-layout 202 determines which service should be displayed therein by pointing to one of the service applications, and determining whether the service application will be displayed as a brieflet, dialog, header, dynamic menus, etc. It should be noted that the Macro Layout can either provide further subdivisions recursively, or link to a service instance. The Macro-layout is typically provided by the service delivery platform, and may, for example, be set by a user in a setup menu on the client device.

The Micro-layouts 203a-c are meta-information that provide the content and layout of the service assigned to each sub region 202a-c. To avoid cluttering the figure only three of Micro-layouts have been provided with a reference numeral. For example, the illustrated Micro-layouts 203a-c may provide news highlights, traffic camera, and e-mail. The Micro-layout contains no absolute positions, thus making it scalable.

Micro-layouts are part of the code of the service applications. Furthermore, by calling additional service applications from the Micro-layout of a "parent" service application, a service package can be created that displays the information or functions from several service applications.

The theme 204 is a set of graphic attributes to provide a desired "look and feel" of the GUI. The theme typically determines the visual appearance in terms of colors, background images, font styles, font sizes, spacing, paragraph style formatting, etc. Themes enable the GUI to be displayed consistently in a variety of styles, and can be used for company branding or to give end-users a menu of styles to suit personal preferences, even though applications are developed by different people and companies. The themes can be created in e.g. Visual Studio, Adobe Illustrator, and Photoshop, and can be implemented by a theme definition file and a style guide file which files typically are different for different renderers. Style guide files used for HTMUHTTP are written in CSSX, i.e. CSS (Cascading Style Sheets) files with embedded script to make them dynamic, whereas style guide files used for BMP (Bitmap) are specified using XML. The theme definition file establishes the theme as an object in the service delivery platform, whereas the style guide file provides the style parameters. The style guide file typically differs for different renderer base types, such as HTMUHTTP, SVG/HTTP, BMP/TCP. For example, there are different style guide files for BMP clients, DHTML (Dynamic Hypertext Markup Language) clients (e.g. laptop screens, browsers), and SVG clients (e.g. mobile phones).

The client-server network also includes a set of rendering plug-ins to help transform the Macro-layout 202 and the Micro-layouts 203 into a GUI 200. Each rendering plug-in is a computer program, plugged in to the service delivery platform and being configured to create a client specific application by transforming a Macro-layout 202 and its associated Micro-layouts 203 into a client specific application by limiting the Macro-layout to the client display resolution, limiting the Micro-layouts to the sub regions, and applying an appropriate theme. The resulting client specific application can then be executed by a specific client device to render a GUI 200.

It can be noted that the rendering plug-ins only handles the hardware resources and capabilities of the client device, and thus require no knowledge about the functionality of the services. This makes it easy to develop service applications for a variety of clients of different types, and virtually eliminates the need to modify the service applications when new types of clients are introduced. It also allows for new client features to be introduced simultaneously for all applications on a server, by simply upgrading or adding renderers and new client devices, without the need to upgrade the service applications.

It is recognized that the client specific application will vary based on the type of rendering plug-in used. For example, a DHTML rendering plug-in renders content as DHTML for web browser access, whereas a bitmap rendering plug-in renders the entire screen at the server and sends it to the client device as a bitmap. As the bitmap-based GUI is used, only the active portions of the screen are sent and the client device updates the corresponding regions accordingly. Multiple layers are maintained to handle client animation during user interaction. Another example of a rendering plug-in is an SVG rendering plug-in, which may preferably be used for embedded devices such as set top boxes and mobile phones where smaller graphics files are a distinct advantage.

The rendering plug-ins may be categorized into standard rendering plug-ins and client specific rendering plug-ins. Unlike the client specific rendering plug-ins, the standard rendering plug-ins has not been configured to handle a specific client. The client specific rendering plug-ins may be based on the standard rendering plug-ins. Thus, it is only required to implement support for what is really unique for that client device, such as, e.g. connection to media player, or specific hardware resources, etc.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims. Also, the disclosed method steps may be executed in any different order.

I claim:

1. A method for defining a graphical user interface (GUI) for a client device comprising a rendering plug-in specific for the client device, the rendering plug-in configured to handle a connection with client specific components of the client device including hardware resources of the client device, the method comprising the steps of:

determining a dedicated display area of a display screen of the client device where the GUI is to be provided;

determining an area resolution of the dedicated display area using the client device specific rendering plug-in;

providing a Macro-layout defining a plurality of sub-regions of the display area, the size and location of each sub-region being allocated according to a predetermined pattern;

providing Micro-layouts for each of the sub-regions; the Micro-layouts defining application services to be assigned to each of the sub-region; and creating a client specific application to be executed by the client device and for allowing a user of the client device to interact with the application services, the client specific application comprising the GUI, the client specific application created using the rendering plug-in being specific for the client device, wherein the step of creating the client specific application comprises:

scaling the Macro-layout to the dedicated display area;

applying a theme to the Micro-layouts, the theme comprising a set of graphic attributes defining a visual appearance of the Micro-layouts; and rendering the GUI, using the client device specific rendering plug-in based on the client specific components, the Macro-layout, the Micro-layouts and the theme.

2. The method according to claim 1, wherein the dedicated display area is defined as the total area of the display screen.

3. The method according to claim 1, wherein the dedicated display area is defined as an area within a window of an application program.

4. A client device comprising a display screen for allowing a user of the client device to interact with a graphical user interface (GUI) having application services, the client device comprising a rendering plug-in specific for the client device, the rendering plug-in configured to handle a connection with client specific components of the client device including hardware resources of the client device, the client device being adapted to:
- determining a dedicated display area of the display screen where the GUI is provided;
- determining an area resolution of the dedicated display area using the client device specific rendering plug-in;
- providing a Macro-layout defining a plurality of sub-regions of the display area, the size and location of each sub-region being allocated according to a predetermined pattern;
- providing Micro-layouts for each of the sub-regions, Micro-layouts defining application services to be assigned to each of the sub-region; and
- creating a client specific application to be executed by the client device and for allowing a user of the client device to interact with the application services, the client specific application comprising the GUI, the client specific application created using the rendering plug-in being specific for the client device, wherein creating the client specific application comprises:
scaling the Macro-layout to the dedicated display area;
applying a theme to the Micro-layouts, the theme comprising a set of graphic attributes defining a visual appearance of the Micro-layouts; and
rendering the GUI based on the client specific components, the Macro-layout, the Micro-layouts and the theme.

5. The client device according to claim 4, wherein the client device is at least one of a computer, a PDA, a controller device, a mobile phone, a touch display, a TV.

6. Method according to claim 1, wherein the dedicated display area is defined as the total area of the display screen.

7. Method according to claim 1, wherein the dedicated display area is defined as an area within a window of an application program.

8. The method according to claim 1, wherein the Macro-layout for each of the sub-regions comprises a link to a specific service application to be assigned to each sub-region.

9. The client device according to claim 4, wherein the Macro-layout for each of the sub-regions comprises a link to a specific service application to be assigned to each sub-region.

* * * * *